United States Patent [19]
McRoberts

[11] 4,346,665
[45] Aug. 31, 1982

[54] APPARATUS AND METHOD FOR DETERMINING VEHICULAR DISTANCE PER FUEL UNIT

[76] Inventor: Richard C. McRoberts, 1225 Harrington Dr., Racine, Wis. 53405

[21] Appl. No.: 128,646

[22] Filed: Mar. 10, 1980

[51] Int. Cl.³ .................. G01D 13/22; G01D 18/00
[52] U.S. Cl. .................. 116/28 R; 116/302; 116/DIG. 23; 235/61 J
[58] Field of Search .......... 116/28 R, 56, 62.1, 116/62.3, 204, 302; 33/DIG. 1, 1 V; 235/61 J, 69, 83; 283/24; 73/114

[56] References Cited
U.S. PATENT DOCUMENTS

| | | | |
|---|---|---|---|
| 1,435,422 | 11/1922 | Schiske | 235/61 J |
| 1,467,847 | 9/1923 | Fulton | 235/61 J X |
| 1,558,452 | 10/1925 | Barbe | 73/113 X |
| 1,889,705 | 11/1932 | Sherwood | 235/61 J |
| 1,965,167 | 7/1934 | Woytych | 116/302 |
| 2,031,192 | 2/1936 | Sutherland et al. | 73/114 |
| 2,711,153 | 6/1955 | Wendt | 116/62.3 |
| 2,765,764 | 10/1956 | Beldt | 116/252 |
| 2,778,004 | 1/1957 | Lear et al. | 116/302 X |
| 2,792,634 | 5/1957 | Howe et al. | 33/DIG. 1 X |
| 3,317,130 | 5/1967 | Evans | 116/302 X |
| 3,423,998 | 1/1969 | Blomgren, Jr. | 73/113 |
| 3,915,112 | 10/1975 | Forester | 116/204 X |
| 4,120,094 | 10/1978 | Pfaelzer | 33/1 V X |

Primary Examiner—Daniel M. Yasich
Attorney, Agent, or Firm—Arthur J. Hansmann

[57] ABSTRACT

Apparatus and method for determining vehicular distance per fuel unit, such as the miles per gallon or liter of fuel consumed in driving a car. The vehicle has a fuel gage, and when stopped on, or operating on level road, a reference mark is made where the fuel gage pointer is then located and the odometer mileage reading is recorded. Vehicle operation is continued and when convenient, fuel is then added to the fuel tank to cause the pointer to show a greater quantity of fuel in the tank than is shown by the reference mark. The vehicle is then driven until the fuel gage pointer again returns to the reference mark, and the total distance traversed is also determined. With the knowledge of the amount of fuel consumed and the total distance traversed, the distance traversed per unit of fuel can be calculated. The reference mark is preferably established by means of a sight device which permits the operator to accurately locate the reference mark in alignment with the fuel gage pointer, and visual assists are available in the sight device for the accurate alignment mentioned.

15 Claims, 13 Drawing Figures

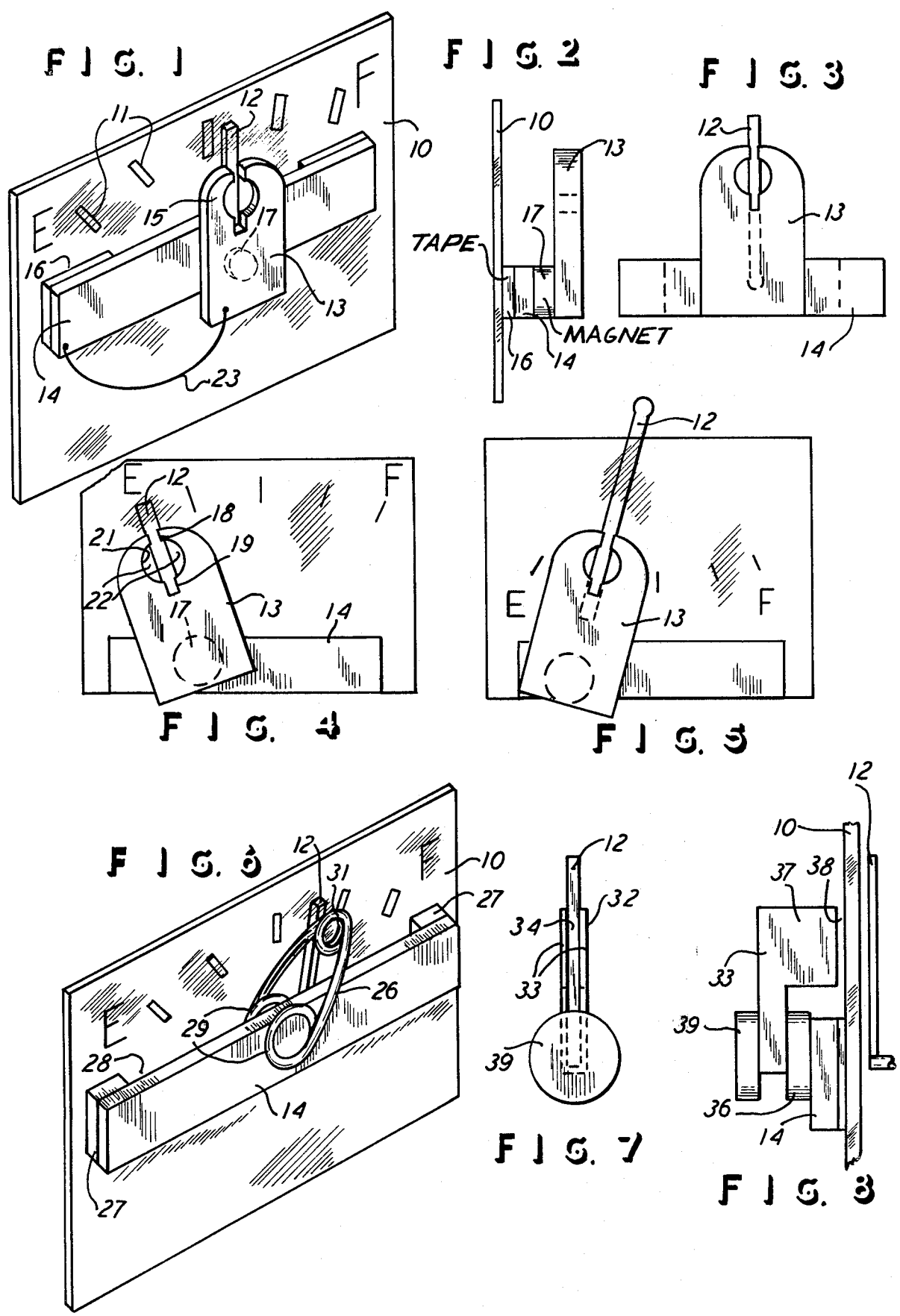

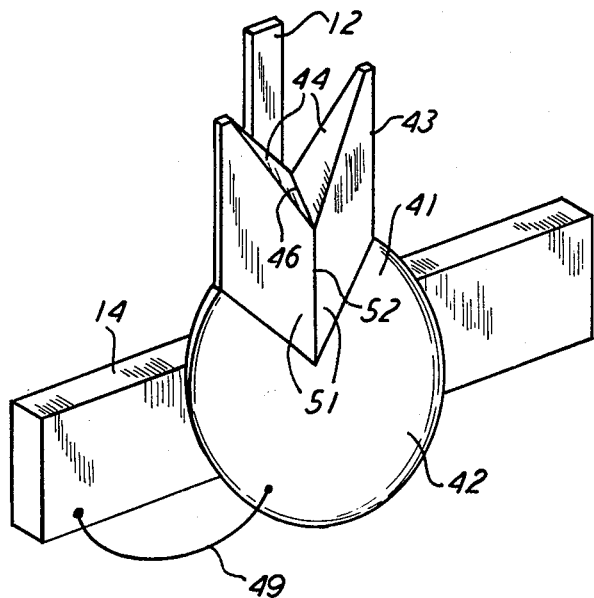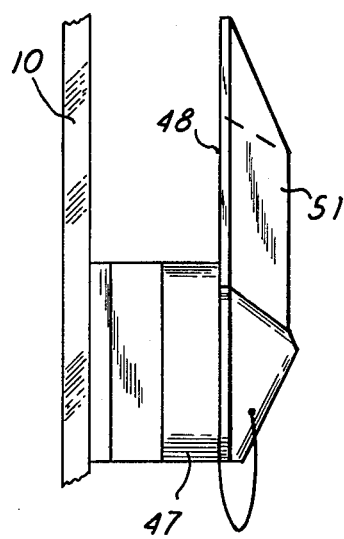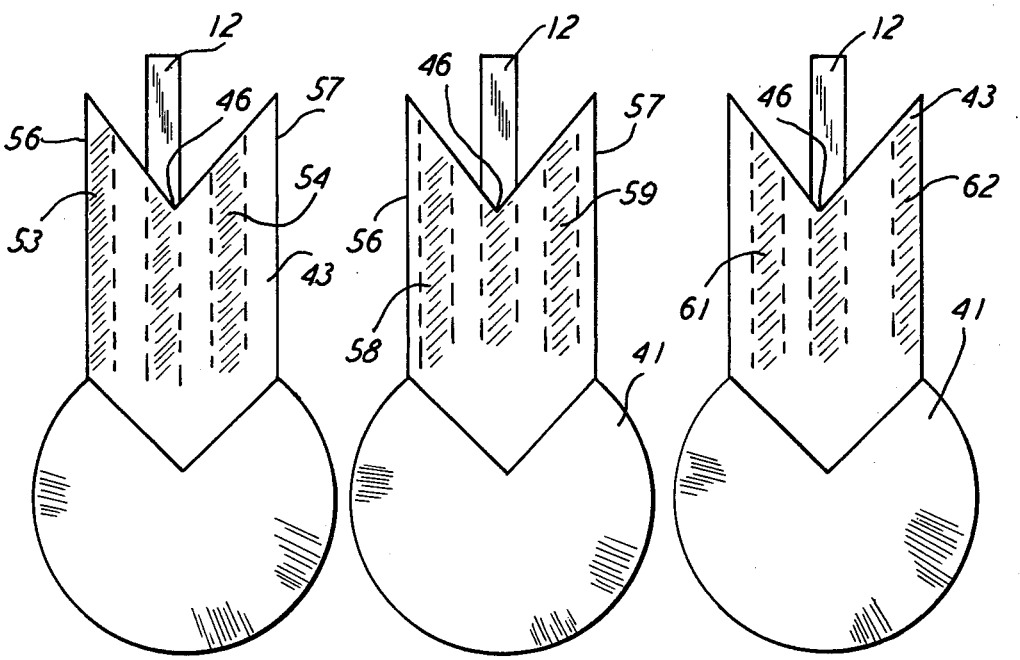

APPARATUS AND METHOD FOR DETERMINING VEHICULAR DISTANCE PER FUEL UNIT

This invention relates to apparatus and method for determining vehicular distance traversed per fuel unit and, more particularly, it relates to apparatus and method for permitting the vehicle operator to determine the distance traveled per unit of fuel, and this can be accomplished while the vehicle is moving, and also the fuel tank need not be filled full in order to make this determination.

BACKGROUND OF THE INVENTION

The problem and concern relative to the present invention is to provide a method and apparatus which will permit the vehicle operator to determine the vehicle distance traversed per fuel unit consumed. Traditionally this is done by fully filling the gas tank and setting the odometer at zero, or noting the mileage on the mileage indicator, and then driving the vehicle for a distance so that the total distance traversed is again noted and the fuel tank is again filled and the amount of gasoline or fuel added to the tank is also noted. With the information of the distance traversed and the amount of fuel added, one can mathematically compute the distance or miles traversed per unit of fuel. However, that requires that the fuel tank be filled on two occasions, and it also requires that the vehicle be stopped so that the fillings can occur and so that the mileage readings and the calculations can be made.

In the present invention the desired determinations can be made while the vehicle is being driven on level road, and it need not be stopped or parked in order to do so. That is, the present invention allows the operator to determine the distance traveled per unit of fuel while the vehicle is being driven and the operator needs to add fuel to the tank only once in order to make an accurate determination on the road and without requiring that there be a stopping and starting and that there be any fuel consumed in that process. Prior art devices for determining fuel consumption are shown in U.S. Pat. Nos. 1,467,847 and 1,558,452 and 1,965,167 and 2,031,192 and 2,765,764 and 2,778,004 and 3,317,130. Those prior art patents differ from the present apparatus and method in that they show indicating gages, such as fuel consumption gages, but they do not show the fuel consumed for a distance traveled, as in the present invention. Specifically, the first of the aforesaid patents shows a mechanism for indicating the quantity of fuel used per hour, and it does not measure the fuel tank fuel level or quantity as such. Likewise, the second patent shows a gage for measuring the fuel consumed per unit of time and and the fourth patent shows a meter for indicating fuel consumption to engine speed. The other references also fail to provide the information for readily and easily determining the distance traversed per unit of fuel consumed.

The present invention provides a method and apparatus for determining the distance traversed per unit of fuel consumed, and it does so by utilizing the already installed or conventional fuel gage and distance-traversed odometer existing in conventional vehicles in present day. That is, no special meters or gages need be connected or installed in order to make the final determination which is desired. Further, the determination desired can be made in accordance with this invention while the vehicle is being driven, and at that time the vehicle need not be stopped and the tank need not be filled, nor any fuel need be added, in order to make that determination.

Further, the present invention provides apparatus and a method for determining the distance traversed per unit of fuel consumed, and it does so by means which are readily and easily accomplished and which utilize the existing gages and meters and requires only an attachment, in the apparatus aspect of this invention, and that attachment is in the nature of a sight device which has portions which assist in accurate marking of the fuel gage pointer position for accurate determination of the calculation desired herein. Included in that accomplishment, is the minimizing of parallax usually present in aligning two spaced-apart sight points, such as the fuel gage pointer and the sight device of this invention, and the parallax phenomenon is minimized by the apparatus of this invention.

Other objects and advantages of the apparatus and method of this invention will become apparent upon reading the following description in light of the accompanying drawings.

BRIEF DESCRIPTION OF THE DRAWINGS

FIG. 1 is a front perspective view of one embodiment of this invention.

FIG. 2 is a side elevational view of the embodiment shown in FIG. 1.

FIG. 3 is a front elevational view of the embodiment shown in FIG. 1.

FIGS. 4 and 5 are front elevational views of the embodiment shown in FIG. 1 and showing it applied to two different types of standard fuel gages.

FIG. 6 is a front perspective view of another embodiment of this invention.

FIGS. 7 and 8 are front and side views, respectively, of another embodiment of this invention.

FIG. 9 is a front perspective view of another embodiment of this invention.

FIG. 10 is a side elevational view of the embodiment shown in FIG. 9.

FIGS. 11, 12, and 13 are front elevational views of the embodiment shown in FIG. 9 and showing the fuel gage pointer in different positions relative thereto.

DETAILED DESCRIPTION OF THE PREFERRED EMBODIMENTS AND THE METHOD

This invention pertains to the apparatus and method for determining the vehicular distance traveled per unit of fuel consumed. There are various ways in which the invention is actually reduced to practice or accomplished, and that involves a variety of physical elements or apparatus for accomplishing the invention. Invention mainly relates to locating a reference mark on a conventional fuel gage and then after fuel has been added to the fuel tank, the vehicle is driven until the fuel gage pointer again returns to the original reference mark. At that time the driver will have noticed the total miles traversed in the consumption of the amount of fuel that was added to the tank, and that consumption is of course determined by having the fuel gage pointer return to its original reference mark location. In that manner, the driver can readily ascertain the distance traversed per unit of fuel consumed, such as miles per gallon of gasoline in a passenger vehicle.

Accordingly, the invention relates to both apparatus and method, and the manner in which the apparatus is actually reduced to practice can take on several different forms, such as shown in the accompanying drawings which are included by way of examples.

FIG. 1 shows a conventional vehicle fuel gage having a transparent face 10 which displays the fuel level by markings 11 and which has the indication of empty by the letter "E", and the indication of full by the letter "F". Also, the conventional gage has the usual fuel gage pointer 12 which of course moves between the empty and full marks. It will be further readily understood by anyone familiar with or skilled in the art that the portion of the fuel gage described and shown in connection with FIG. 1 is conventional and is incorporated in a conventional vehicle and it may register the quantity of gasoline in a passenger car which has a conventional fuel tank which is not shown and the vehicle would also have a conventional odometer or distance-traversed indicator which is also not shown.

FIGS. 1 through 5 show the one embodiment of the apparatus of this invention, and it will here be noticed that a sight device 13 is suitably disposed in front of the fuel gage and it has an upper portion designated 15 which is specifically and particularly arranged for visually aligning with the fuel gage pointer 12 in order to establish a so-called reference mark as to the location of the pointer 12 in an initial position of the pointer 12. To accomplish this in the first embodiment shown, a mounting support member 14 is attached to the fuel gage face 10 in a fixed position, and adhesive or like tape or attachment means 16 is employed to secure the bar 14 in the fixed position where the bar extends across the front of the gage face 10 which is of a plastic or glass or other transparent material of a conventional nature. With further reference to the particular embodiment shown, the sight device 13 is detachably mounted to and is movably positioned relative to the bar 14 and thus relative to the fuel gage itself and particularly the pointer 12. To accomplish that, the bar 14 is of a magnetically attractive material, and a magnet 17 is affixed to the back of the sight device 13, as shown in FIGS. 2, 4, and 5. Thus, one can readily position the sight device 13 along the bar 14 in any selected position, and one can also tip the sight device 13 relative to the bar 14 and thus to the fuel gage itself, such as indicated in FIGS. 4 and 5 where the sight device 13 is shown in the tipped positions. In those positions, the sight device 13 will accurately align with the gage pointer 12 which is normally on a pivot axis and thus pivots across the face of the fuel gage itself, all in a conventional manner, and therefore the sight device 13 can be accurately aligned with the pointer 12 to establish the reference mark desired. Alternately, the same components are applicable to a fuel gage which is rotated 90 degrees to the gages shown in FIGS. 4 and 5.

The drawings further show that the sight device 13 has a slot or opening 18 in the upper end thereof and it also has a slot or opening 19 in the mid portion thereof. Intermediate the slots 18 and 19 there is a circular opening 21, and these openings 18, 19, and 21 extend completely through the device 13 which is of an opaque material and thus the pointer 12 can be viewed only when it is aligned with the three openings mentioned. Thus, the device 13 has a first portion, consisting of the slots 18 and 19, which can be aligned with the pointer 12, such as shown in FIGS. 3, 4, and 5, and the device 13 also has an additional alignment portion provided by the opening 21 which will also be aligned with the pointer 12 when the device 13 is suitably positioned.

That is, the opening 21 is an additional portion of the device 13 which aligns with the pointer 12 when the alignment portions 18 and 19 are also aligned with the pointer 12. In that manner, the accurate alignment of the sight device 13 with the pointer 12 is achieved and is readily arranged, and that alignment establishes the so-called reference mark for the position of the pointer 12 prior to the time that fuel is added to the tank. In that arrangement, one can observe the half-moon shaped openings 22, as shown in FIG. 4, and determine that those two half-moon portions are of equal dimensions and thus be assured that the sight device 13 is accurately aligned with the pointer 12 and thus the so-called reference mark is accurately located. In that regard, the operator would look directly at the sight device 13 from a directly forward or head-on position relative to the device 13, and thus the element of visual parallax would be eliminated and therefore the accurate positioning of the sight device 13 in alignment with the pointer 12 is accomplished and is readily and easily established.

Of course the magnetic strength between the sight device 13 and the bar 14 is such that the operator can easily position the device 13 along the bar 14 and in the tilted positions desired, such as indicated in FIGS. 4 and 5, but the magnetic strength is such that the sight device 13 will remain in that position even under vibration due to the operation or driving of the vehicle. Of course it will be seen and understood that the difference between the showings in FIGS. 4 and 5 is that in FIG. 4 the pointer 12 is pivoted at its lower end, and thus the fuel gage is arranged to show that movement and position of the pointer 12; and in FIG. 5, the pointer 12 is pivoted at its upper end and therefore that fuel gage is arranged accordingly.

Of course in all instances shown and described herein, the magnetically attractive or support bar 14 is located on the fuel gage face plate 10 in a position out of alignment with the markings of "E" and "F" and the other markings on the conventional fuel gage and thus the operator can still readily read those markings and the bar 14 does not obscure any view thereof. Still further, it will now be seen and understood that the embodiment of this invention is such that it is an attachment for a conventional type of fuel gage, and a completely new or different or complex type of fuel gage need not be installed in the vehicle in order to obtain the desired information sought and obtained herein.

After the sight device 13 has been aligned with the pointer 12 as described above, fuel is added to the fuel tank and that will of course cause the pointer 12 to move to the right or toward the "F" mark but it may be preferred that only ten units of fuel be added to the tank, and at the same time the gage showing the distance traveled by the vehicle at that time is also noted. The vehicle is then driven an additional distance until the pointer 12 moves sufficiently far to the left to again align with the sight device 13 and that will indicate that the added amount of fuel has now been consumed, say the ten units of fuel previously added. At that time, the distance-traversed odometer is also again noted so that the total distance traversed can be determined. Dividing that distance by ten will of course establish the desired calculation of distance traversed per unit of fuel consumed. Of course the operator could add a different quantity of fuel, other than the ten units, but obviously the ten units make the calculation easy to determine and it can be readily done while the car or vehicle is still being driven and one need not stop to refill the tank to determine the amount of fuel consumed nor need one stop in order to calculate the determinations desired.

Alternatively, the sight device can be aligned with the pointer 12 and the odometer reading recorded while the vehicle is level, either stopped or moving on level road. A substantial portion of the fuel in the tank can then be consumed by travelling, say nine gallons. Fuel can then be added to the tank, say ten gallons, and that will cause the pointer to move to the right of the reference mark. Then only the one additional gallon need be consumed to have the pointer again align with the reference mark. The distance per fuel unit can then be determined.

FIG. 1 also shows that there can be a string or like attaching line 23 connected between the fixed bar 14 and the sight device 13 so that the sight device cannot be inadvertently lost or knocked down to the floor. Further, as clearly shown in FIG. 2, the sight device 13 can be readily fingered by the operator to be gripped and positioned, as desired, and that is accomplished by the fact that the device 13 is positioned in front of the fuel gage face plate 10, as shown. Further, it will be desirable that the total quantity of fuel added to the tank be exactly a full number of fuel units, that is, there be no fraction of the fuel units in the total quantity added, and that will of course simplify calculation. Still further, there may be a table (which is not shown) desired and that would show the distance traveled per unit of fuel consumed and the showing would be in accordance with one side of the table indicating distance traveled and another side of the table indicating the fuel units consumed so that the reading as to the distance per fuel unit could be found in the table and thus avoid the mathematics or the division required if the table were not employed. Such table is conventional and apparent to the art.

In contrast to the embodiment shown in FIGS. 1 through 5 where the magnet 17 is affixed to the sight device 13 and thus the device 13 is readily positionable along the magnetically attractive bar 14, FIG. 6 shows a friction type of attachment device 26 which is in the form of a spring clip attachable to the bar 14 affixed to the fuel gage face plate 10 as described in connection with FIG. 1. Thus, the bar 14 is held to the transparent fuel gage face plate 10 by means of adhesive material or strips 27, for instance, and thus the bar is spaced from the plate 10 by space designated 28. This permits the two loops 29 of the sight device 26 to be movably attached to the bar 14 in any desired position and to remain in that set position even under vibration of the automobile or vehicle in its normal use. Of course the operator can readily re-position the device 26 simply by fingering the device 26 and pivoting it or moving it along the bar 14, as desired in order to align the device 26 with the fuel gage pointer 12, as described in connection with the first embodiment. That is, the device 26 has an opening 31 in the upper end thereof, and that is a circular opening as shown and it extends of course through the device 26 so that one can sight through the opening 31 and view the pointer 12 behind it. As such, the opening 31 can be aligned with the pointer 12 and thus the reference mark establishing the location of the pointer 12 can be accomplished. In that arrangement, it is preferred that the size of the opening 31 be of a diameter greater than the width of the pointer 12, and thus the viewing would be similar to that shown in FIGS. 4 and 5 in connection with the opening 21 and the pointer 12 in those views. As such, the two semi-circular of half-moon showings would exist on opposite sides of the viewing of the pointer 12 through the opening 31, and thus the accurate aligning of the opening 31 and the minimizing of parallax are accomplished.

FIGS. 7 and 8 show a third embodiment of the invention, and in this instance a sight device 32 is arranged with two spaced-apart planar sheets 33 which present a space 34 therebetween, as seen in FIG. 7. Thus the pointer 12 can be viewed through the space 34, and the alignment can be accomplished and the parallax is again minimized. Further, a magnet 36 is affixed to the plates 33 at the lower ends thereof, and thus the magnet is available for attachment and positioning along the mounting bar 14 which is again affixed to the fuel gage face plate 10 in front of the pointer 12.

FIG. 8 shows that the planar portions 33 extend in an offset portion 37 to project close to and adjacent the face plate 10 so that only a very small space 38 exists between the plates 33 and the face plate 10. Therefore, parallax is again minimized and an accurate alignment of the sight device 32 with the pointer 12 is accomplished. Also, an additional magnet 39 is affixed to the plates 33 and extends to the side thereof opposite from the location of the magnet 36, and thus the operator could actually turn the sight device 32 around and position it in the opposite position from that clearly shown in FIG. 8 such that the wings or projection 37 would extend away from the face plate 10 instead of toward the face plate 10 as shown in FIG. 8. That might be desired for personal preference in viewing the pointer 12 and is thus available. Also, the additional projection or magnet 39 if it be such, is available as a grip for fingering by the operator so that the total device 32 can be readily manipulated and accurately positioned while holding the convenient circular member or magnet 39.

Still another embodiment is shown in FIGS. 9 through 13, and here there is a sight device 41 which can be positioned on the attachment bar 14 in any position therealong and at any angle of tilt or inclination, such as mentioned in connection with FIGS. 4 or 5, for instance. Thus the device 41 is aligned with the pointer 12 and serves the purpose of the sight devices previously mentioned. The device 41 is a prism which has a lower portion 42 for fingering and which has an upper portion 43 for viewing by the operator and for being aligned with the pointer 12 to establish the reference mark mentioned. Two angled surfaces 44 are formed in the upper portion 43 and terminate at an apex 46 to thus present an angled notch or the like in the upper portion 43 through which the operator can view the pointer 12 and align the apex or notch 46 with the pointer 12.

Again, a magnet 47 is affixed to the rear surface 48 of the sight device 41, and thus the magnet 47 is available for attachment to the magnetically attractive member or bar 14 for positioning the device 41 as desired. Further, a line or string 49 is attached between the device 41 and the bar 14 so that the device 41 cannot be misplaced or lost. FIG. 10 shows the arrangement of the embodiment of this invention located in front of the fuel gage transparent face plate 10, all for the purpose described in connection with the previous embodiments.

FIGS. 11, 12, and 13 show that, since the device 41 is of a transparent material and is a prism, since it has the front angled faces 51 which meet at an upright center line 52, the accurate alignment of the device 41 with the pointer 12 can be accomplished. Thus, FIG. 11 shows that if the device 41 is to the right of the pointer 12, as viewed from the front, then the pointer 12 will not align with the apex 46, but it will be to the left thereof, as shown in FIG. 11, but also the reflections of the pointer 12, as shown by the shaded areas 53 and 54 will be offcenter and to the left with respect to the upper portion 43 which has the upright parallel walls 56 and 57 determining the sidewalls of the device 41. FIG. 12 shows the view of the arrangement when the device 41 is aligned with the pointer 12, and it will here be seen that the pointer 12 is in complete and accurate alignment with the apex 46 and also the shaded areas 58 and 59 which reflect the pointer 12 in the prism effect of the device 41 are centered relative to the upper portion 43 and are equally spaced relative to the sidewalls 56 and 57 of the device 41. In that manner, the operator can accurately align the device 41 with the pointer 12 and be assured that it is aligned and the matter of parallax is eliminated. Finally, FIG. 13 shows the view through the prism device 41 when the device is located to the left of the position of the fuel gage pointer 12. Again, the apex 46 is shown offcenter relative to the pointer 12, and the shaded areas 61 and 62 reflecting the pointer 12 in the upper portion 43 of the prism readily show that the alignment is not achieved, since the shaded areas 61 and 62 are shown offset to the right relative to the center or alignment surfaces described in connection with the prism upper portion 43.

In all of the embodiments shown, it will also be understood that the sight device is mounted on the bar or holder 14 in any suitable manner of attaching thereto, and it will also be understood that the bar 14 is in a position to intersect with the horizontal projection of the fuel gage pointer such that the sight device will extend adjacent the fuel gage pointer. Further, in the first and last embodiments described, each has a first portion for aligning with the pointer 12 and it then has a second portion for further determining the alignment. That is, the first embodiment has the portions 18 and 19 for initial alignment and it has the portion or opening 21 for additional alignment. Likewise, the last embodiment has the portion 46 for initial alignment and it then has the prismatic portion 43 which has the angled faces 51 for the additional alignment. In all the embodiments, there are two spaced-apart surfaces in the sight device for aligning with the gauge pointer. These surfaces face toward each other and they are, in FIGS. 1-5, the two surfaces defining the half moons 22 and also the two surfaces defining the two slots 18 and 19; in FIG. 6 they are the two diametrically opposite sides of the opening 31 on the left and right sides thereof; in FIGS. 7 and 8 they are the surfaces on the inner facing of the plates 33; and in FIGS. 9-13 they are the surfaces 44.

The method aspect of this invention has been described in the foregoing and in connection with the description of the several embodiments shown. One will now readily understand that the method is to establish a reference mark as to the initial position of the pointer 12 and to then also note the miles traversed according to the distance-traveled gage of the vehicle. Next, the additional fuel is added to the tank and the vehicle is driven until the pointer 12 returns to the reference mark position which has been established by and which is maintained by the sight device or by the establishment of a reference mark, as mentioned. Again the distance traversed is noted so that the total distance traveled can be determined and that can be divided by the quantity of fuel last added to the tank and now consumed at the time that the pointer 12 returned to its initial reference mark, and from those numbers the distance traversed per unit of fuel can be determined.

What is claimed is:

1. In a method for determining vehicular distance traveled per unit of fuel consumed by a vehicle having a distance-traversed odometer and a fuel tank and a fuel gage with a pointer, the steps comprising detachably mounting a selectively horizontally movable reference mark on a support member on the gage and in alignment with the fuel pointer on the fuel gage to thereby present the reference mark for the quantity of fuel to be consumed, noting the distance-traversed reading showing on the distance-traversed odometer, adding a quantity of fuel to the fuel tank to thereby cause the fuel gage pointer to indicate the total quantity of fuel in the fuel tank and noting said total quantity, driving the vehicle for a sufficient distance to cause the fuel gage pointer to return to the reference mark, and noting the total said sufficient distance driven and dividing said sufficient distance by the quantity of fuel previously added to the tank to determine the distance traveled per fuel unit.

2. In a method for determining vehicular distance traveled per unit of fuel consumed by a vehicular having a distance-traversed odometer and a fuel tank and a fuel gage with a pointed for indicating "empty" and "full" tank conditions, the steps comprising detachably mounting a selectively horizontally movable reference mark on a support member on the gage and in alignment with the fuel pointer on the fuel gage to thereby present the reference mark for the quantity of fuel to be consumed, noting the distance-traversed reading showing on the distance-traversed odometer, driving the vehicle to cause the fuel pointer to move to the side of the reference mark toward the "empty" condition, adding a quantity of fuel to the fuel tank to thereby cause the fuel gage pointer to move to the side of the reference mark toward the "full" condition, driving the vehicle for a sufficient distance to cause the fuel gage pointer to return to the reference mark, and noting the total said sufficient distance driven and dividing said sufficient distance by the quantity of fuel previously added to the tank to determine the distance traveled per fuel unit.

3. The method for determining vehicular distance traveled per unit of fuel consumed, as claimed in claim 1 or 2, including the steps of providing a sight device having a portion positionable relative to the fuel pointer and establishing the reference mark by aligning said portion with the fuel gage pointer.

4. The method for determining vehicular distance traveled per unit of fuel consumed, as claimed in claim 1 or 2, including the steps of providing a magnetically attractive member and attaching same to the fuel gage, and providing a magnetically attractive sight device and respectively attaching same and aligning same relative to said member and the fuel gage pointer.

5. The method for determining vehicular distance traveled per unit of fuel consumed, as claimed in claim 1 or 2, wherein the step of adding fuel to the tank consumes a total quantity of exactly a full number of the units, that is, no fractions of the units in said total quantity.

6. The method for determining vehicular distance traveled per unit of fuel consumed, as claimed in claim 5, wherein the total quantity of fuel added is in units of a number ending in zero, that is, either ten or twenty.

7. The method for determining vehicular distance traveled per unit of fuel consumed, as claimed in claim 1 or 2, including the step of providing a table showing the distance traveled per unit of fuel consumed, and so showing in accordance with a plurality of showings of distances traveled and a plurality of showings of fuel units consumed, and finally reading said distance driven on the distance-traversed odometer and applying both that reading and the noting of the total quantity of fuel added to said table and determining the distance driven per unit of fuel consumed.

8. Apparatus for determining vehicular distance traveled per unit of fuel consumed by a vehicle having a distance-traversed odometer and a fuel tank and a fuel gage with a pointer, comprising a sight device having two spaced-apart surfaces faced toward each other for aligning with said fuel gage pointer for establishing a reference location relative to said fuel gage, a holder attached with said sight device and being horizontally selectively positionable on a support member on the fuel gage for releasably holding said sight device in the aligned position relative to said fuel gage pointer, whereby the vehicle operator can align said sight device portion with said fuel gage pointer and make a first reading of said distance-traversed odometer and add fuel to said fuel tank and subsequently drive the vehicle until said fuel gage pointer returns to its aligned position with said sight device position whereupon a second reading of said distance-traversed odometer is made, all for determining the distance traveled per unit of fuel consumed.

9. The apparatus for determining vehicular distance traveled per unit of fuel consumed by a vehicle having a distance-traversed odometer and a fuel tank and a fuel gage with a pointer, as claimed in claim 8, wherein said sight device and said holder are magnetically attractive elements for releasably holding said sight device in the aligned position.

10. The apparatus for determining vehicular distance traveled per unit of fuel consumed by a vehicle having a distance-traversed odometer and a fuel tank and a fuel gage with a pointer, as claimed in claim 8, wherein said sight device and said holder are frictionally held together for releasably holding said sight device in the aligned position.

11. The apparatus for determining vehicular distance traveled per unit of fuel consumed by a vehicle having a distance-traversed odometer and a fuel tank and a fuel gage with a pointer, as claimed in claim 8, 9, or 10, wherein said holder is attachable to said fuel gage.

12. The apparatus for determining vehicular distance traveled per unit of fuel consumed by a vehicle having a distance-traversed odometer and a fuel tank and a fuel gage with a pointer, as claimed in claim 8, wherein said sight device is a prism for sighting said fuel gage pointer.

13. The apparatus for determining vehicular distance traveled per unit of fuel consumed by a vehicle having a distance-traversed odometer and a fuel tank and a fuel gage with a pointer, as claimed in claim 8, 9, or 10, wherein said holder is of a size and is attached to said fuel gage to be free of obscuring viewing of said fuel gage pointer.

14. The apparatus for determining vehicular distance traveled per unit of fuel consumed by a vehicle having a distance-traversed odometer and a fuel tank and a fuel gage with a pointer, as claimed in claim 8, wherein said two spaced-apart surfaces are a pair of spaced-apart plates for aligning with said fuel gage pointer.

15. The apparatus for determining vehicular distance traveled per unit of fuel consumed by a vehicle having a distance-transversed odometer and a fuel tank and a fuel gage with a pointer, as claimed in claim 8, 9, 10, 11, 12, 13, or 14, wherein said holder is attached to said fuel gage in a position to intersect with the horizontal projection of said fuel gage pointer and to thereby present a mounting for said sight device to have said sight device extend adjacent to said fuel gage pointer.

* * * * *